United States Patent [19]

Barsoum

[11] Patent Number: 5,451,365
[45] Date of Patent: Sep. 19, 1995

[54] METHODS FOR DENSIFYING AND STRENGTHENING CERAMIC-CERAMIC COMPOSITES BY TRANSIENT PLASTIC PHASE PROCESSING

[75] Inventor: Michel Barsoum, Lansdowne, Pa.

[73] Assignee: Drexel University, Philadelphia, Pa.

[21] Appl. No.: 66,514

[22] Filed: May 24, 1993

[51] Int. Cl.⁶ .................................. B22F 3/14
[52] U.S. Cl. .................................. 419/10; 419/17; 419/19; 419/39; 419/45; 419/48
[58] Field of Search .................. 419/10, 12, 13, 14, 419/17, 18, 19, 39, 45, 48

[56] References Cited

U.S. PATENT DOCUMENTS

| | | | |
|---|---|---|---|
| 2,746,133 | 5/1956 | Lowe | 29/182.8 |
| 2,776,468 | 1/1957 | Steinitz | 29/182.5 |
| 3,143,413 | 8/1964 | Krapf | 75/201 |
| 3,262,761 | 7/1966 | Bechtold | 29/182.5 |
| 3,353,954 | 11/1967 | Williams | 75/201 |
| 4,343,651 | 8/1982 | Yazu et al. | 75/238 |
| 4,605,440 | 8/1986 | Halverson et al. | 75/238 |
| 4,610,726 | 9/1986 | King | 75/233 |
| 4,689,077 | 8/1987 | Chevigne et al. | 75/233 |
| 4,704,250 | 11/1987 | Cline et al. | 419/15 |
| 4,746,363 | 5/1988 | De Angelis | 75/244 |
| 4,879,262 | 11/1989 | Halverson et al. | 501/87 |
| 4,906,295 | 3/1990 | Miyamoto et al. | 75/239 |
| 4,944,800 | 7/1990 | Kolaska et al. | 75/238 |
| 4,961,902 | 10/1990 | Clere et al. | 419/12 |
| 4,965,044 | 10/1990 | Miamoto et al. | 419/12 |
| 5,017,217 | 5/1991 | Clere et al. | 75/244 |
| 5,120,681 | 6/1992 | Cameron | 501/89 |
| 5,137,867 | 8/1992 | Ray et al. | 505/1 |
| 5,256,368 | 10/1993 | Oden et al. | 419/10 |

*Primary Examiner*—Donald P. Walsh
*Assistant Examiner*—Chrisman D. Carroll
*Attorney, Agent, or Firm*—Panitch Schwarze Jacobs & Nadel

[57] ABSTRACT

A ceramic composite may be densified, strengthened and toughened by the present transient plastic phase processing method. The ceramic composite comprises a transient plastic phase and a reactant phase. The transient plastic phase includes a metallic component and may also include a non-metallic component. The transient plastic phase has a yield strength which is a function of the stoichiometric concentration of the metallic component therein. In the present method, heat and pressure are applied to the ceramic composite to plastically deform the transient plastic phase of the composite and densify the composite. The densified composite is heated to react the transient plastic phase and the reactant phase in the solid state at a reaction temperature lower than the melting temperature of either of the transient plastic phase or the reactant phase. A portion of the metallic component of the transient plastic phase is transferred to a reinforcing phase whereby a strengthened and toughened ceramic composite is formed comprising: (1) a matrix phase which has a higher yield strength and is more refractory than the transient plastic phase; and (2) a reinforcing phase in the matrix phase which is formed in situ from the reactant phase and the portion of the metallic component transferred from the transient plastic phase.

25 Claims, 2 Drawing Sheets

METHODS FOR DENSIFYING AND STRENGTHENING CERAMIC-CERAMIC COMPOSITES BY TRANSIENT PLASTIC PHASE PROCESSING

FIELD OF THE INVENTION

The present invention relates generally to densifying and strengthening ceramic-ceramic composites and, more particularly, to improving the mechanical, chemical, thermal, electrical and magnetic properties of such composites by transient plastic phase processing.

BACKGROUND OF THE INVENTION

The demand for materials exhibiting exceptional hardness, durability and stability at very high temperatures (in excess of 1500° C.) has led to renewed interest in refractory materials, such as carbides, borides, beryllides, nitrides and silicides. For example, ultra-refractory ceramic-ceramic composites, especially silicides, may exhibit sufficient oxidation resistance to be used as structural components at elevated temperatures. Potential applications for ultra-refractory ceramic-ceramic composites include energy-related technologies, such as internal combustion and jet engines and heat exchangers, and metal cutting and forming technologies, such as cutting tools and dies. One of the major challenges to be surmounted if ceramic-ceramic composites are to be widely used as high temperature structural materials is the difficulty and cost associated with processing the materials into dense complex shapes.

An example of a refractory material having a high melting point, hardness and electrical conductivity is titanium diboride ($TiB_2$). J. Ramberg et al., "Resistance of $TiB_2$ to High Temperature Yielding", 68 *J. Am. Cer. Soc'y* C78–C79 (1985) discloses that ultrapure fine grain $TiB_2$ displays extraordinary resistance to plastic deformation at elevated temperatures because of the high Peierls stress intrinsic to the material. Titanium diboride has a fracture toughness of about 5 MPa m$^{\frac{1}{2}}$. In contrast, titanium carbide (TiC) deforms plastically at 1000° to 1500° C., as discussed by W. Williams, "Influence of Temperature, Strain Rate, Surface Condition and Composition on the Plasticity of Transition-Metal Carbide Crystals" 35 *J. Appl. Phys.* 1329–38 (1964). Williams discloses, however, that TiC can be precipitation hardened by $TiB_2$ at high temperatures by the addition of a fraction of a percent of boron. This combination of extreme resistance to plastic deformation, precipitation hardening and the high temperature plasticity intrinsic to the TiC phase suggests that $TiB_2$—TiC composites would be attractive high-temperature structural ceramics. In the $TiB_2$—TiC system, the eutectic temperature is greater than 2600° C.

Ideally, materials should be processed in a soft, ductile condition and then strengthened by heat treatment, an approach which is fundamental in metallurgy. This concept has also been applied to ceramic materials. In the glass-ceramic industry, parts are formed and shaped from molten material and subsequently heat treated to crystallize the glass into a more refractory and tougher material. In transient liquid phase sintering, the liquid phase solidifies by diffusional homogenization during sintering, as discussed in R. German, *Liquid Phase Sintering*, Plenum Press, (New York 1985). Recently transient viscous sintering has been shown to facilitate the fabrication of mullite and mullite composites, as discussed in M Sacks et al., "Fabrication of Mullite and Mullite-Matrix Composites by Transient Viscous Sintering of Composite Powders", 74(10) *J. Am. Cer. Soc'y* 2428–37 (1991). In each of the aforementioned processes, a viscous, easily deformable phase is formed during fabrication, after which the phase is removed by crystallization or reaction.

Since carbides, borides, beryllides, nitrides and silicides have high melting temperatures, they are extremely hard to process. Attempts to fabricate monolithic and composite materials have involved particulate processing at very high sintering temperatures. However, such processes are generally incapable of achieving full density. For example, when a mixture of TiC and $TiB_2$ powder is hot pressed at 2200° C. at a pressure of 10 MPa, only 90% of theoretical full density is achieved, as disclosed by I. Spivak et al., "Creep in the Binary System $TiB_2$—TiC and $ZrB_2$—ZrN", 137 *Sov. Powder Metall. Met. Cer.* 617–20 (1974).

To attempt to reduce the difficulties in densification, several modifications of press and sinter technology and/or particulate processing alternatives have been evaluated. For example, ultra-fine plasma arc derived powders may be pressurelessly sintered at temperatures above 2000° C., as disclosed by H Baumgartner et al., "Sintering and Properties of Titanium Diboride Made from Powder Synthesized in a Plasma-Ard Heater", 67 *J. Am. Cer. Soc'y* 207–12 (1984). The addition of relatively large amounts of sintering aids and liquid phase sintering in the processing of cemented carbides has also been suggested. More recently, ceramic-ceramic composites have been produced by direct reaction between a preform of a high temperature material and a liquid metal, e.g., $B_4C$ and liquid Zr to yield $ZrC$—$ZrB_2$, as disclosed by W. Johnson et al., "Preparation and Processing Platelet-Reinforced Ceramics by the Directed Reaction of Zirconium with Boron Carbide, "10(7–8) *Cer. Eng. Sci. Proc.* 588–98 (1989).

Generally, the formation of refractory compounds from the constituent elements occurs exothermically and exceptionally rapidly. These characteristics are exploited in the formation of a large number of materials by self-propagating high temperature synthesis, as discussed by J. Crider, "Self Propagating High Temperature Synthesis-A Soviet Method for Producing Ceramic Materials", 6(7–8) *Cer. Eng. Sci. Proc.* 520–29 (1985); J. McCauley et al., "Simultaneous Preparation and Self-Sintering of Materials in the System Ti—B—C" 3(9–12) *Cer. Eng. Sci. Proc.* 7 538–54 (1982); and U.S. Pat. Nos. 4,906,295 and 4,965,044.

U.S. Pat. No. 4,605,440 discloses boron-carbide-reactive metal composites prepared by (1) consolidation or preparation of the starting materials; (2) producing a capillarity-thermodynamic condition or wetting (forming a solid-liquid interface between) the starting materials; and (3) reacting or sintering the starting materials to produce the desired compositions.

U.S. Pat. Nos. 4,961,902 and 5,017,217 disclose methods for manufacturing ceramic/metal or ceramic/ceramic composite articles. The method includes the steps of (1) providing a mixture of first and second solid, particulate reactants in finely divided form; (2) heating the mixture up to a first temperature that is below the peritectic decomposition temperature of the second metal reactant at a moderately increasing rate; (3) heating the mixture through the peritectic decomposition temperature of the second metal reactant; (4) sintering the mixture; and (5) cooling the resulting reaction product. The first metal is a metal of Group IVb, Vb or VIb of the Periodic Table or mixtures thereof. The second metal compound must include a substance subject to peritectic decomposition, typically a boride compound.

The prior art processing methods discussed above are generally not capable of fabricating complex shaped ultra-refractory, fully dense, ceramic-ceramic composites at temperatures well below the melting temperatures of the components. Also, by eliminating the need for sintering aids as discussed below, the high temperature properties of the composites, such as creep resistance, would be greatly enhanced. The ability to incorporate other reinforcing agents, such as fibers or whiskers, into the composite to control strength and/or toughness is also desirable.

One of the more difficult problems associated with ceramics in general and ceramics to be used in structural applications in particular, is the fact that they are not easily joined to other parts. This places a severe limitation on their final use. The fabrication of graded composites, however, in which the side of the composite that would not be subjected to extreme temperatures and that is to be joined to other parts would be a metal and the other side, which is subjected to the extreme temperatures, is a ceramic-ceramic composite would be attractive. Another advantage of a graded structure lies in the fact that the metal outer skin may function as a ductile phase for blunting cracks in the refractory composite and prevent catastrophic failure.

SUMMARY OF THE INVENTION

By the methods of the present invention, a ceramic composite may be densified, strengthened and toughened at temperatures well below the melting temperature of the constituents to permit cost effective mass production of near-net shape composites having unique mechanical, chemical, electrical and magnetic properties. The present methods involve the processing of ceramic composites which comprise (1) a transient plastic phase comprising a metallic component and (2) a reactant phase. The transient plastic phase has a yield strength which is a function of the stoichiometric concentration of the metallic component in the transient plastic phase.

According to the present methods, heat and pressure are applied to the green ceramic composite to plastically deform the transient plastic phase and thereby densify the ceramic composite. The densified composite is heated to react the transient plastic phase and reactant phase in the solid state at a reaction temperature lower than the melting temperature of either of the transient plastic phase or the reactant phase so as to transfer a portion of the metallic component of the transient plastic phase to a new reinforcing phase. By these methods, a strengthened and toughened ceramic composite is formed comprising (1) a matrix phase which has a higher yield strength and is more refractory than the transient plastic phase; and (2) a reinforcing phase in the matrix phase which is formed in situ from the reactant phase and the portion of the metallic component transferred from the transient plastic phase.

In an alternative embodiment, the reactant phase may be mixed with transient plastic phase to form the ceramic composite, the transient plastic phase being formed in situ from the metallic component and a non-metallic component.

In another alternative embodiment, a metallic component is reacted with a non-metallic compound to form in situ (1) the transient plastic phase from a portion of the metallic component and a first component of the non-metallic compound as well as (2) the reactant phase from another portion of the metallic component and a second component of the non-metallic compound, i.e., to form the ceramic composite.

BRIEF DESCRIPTION OF THE DRAWINGS

The foregoing summary, as well as the following detailed description of the preferred embodiments, will be better understood when read in conjunction with the appended drawings. For the purpose of illustrating the invention, there are shown in the drawings embodiments which are presently preferred, it being understood, however, that the invention is not limited to the specific arrangements and instrumentalities disclosed. In the drawings.

DETAILED DESCRIPTION OF THE PREFERRED EMBODIMENTS

By the methods of the present invention, ultra-refractory, ceramic composites may be fabricated by a transient plastic phase process (TPPP) at temperatures well below the melting temperature of any of the components of the composite. The TPPP involves a solid state reaction between two or more phases in particulate form. The present method is useful for forming near-net shape ceramic composites for refractory applications, particularly those applications which require strong, high temperature-resistant structural materials.

Figure 1:
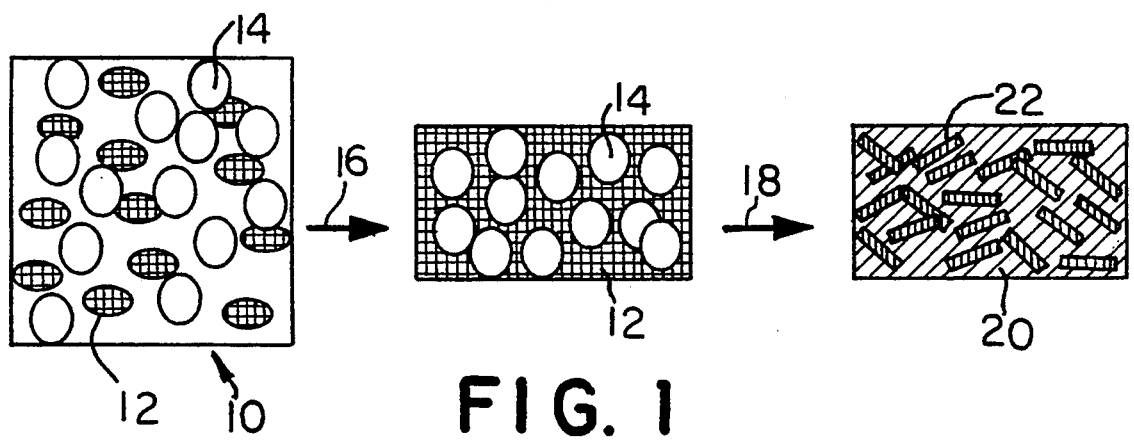
FIG. 1 is a schematic diagram of the transient plastic phase process of the present invention.

Referring to the drawings, wherein like numerals indicate like elements throughout, there is shown in FIG. 1 a diagram of a preferred method for densifying and strengthening a ceramic composite, indicated generally at 10, by the TPPP method of the present invention.

Referring to the first (left-hand) block of FIG. 1, the ceramic composite 10 comprises a transient plastic phase 12 and a reactant phase 14. The transient plastic phase 12 comprises a metallic component and preferably also a non-metallic component.

Preferably, the metallic component of the transient plastic phase is at least one transition metal. Preferred transition metals include those in groups IIIB, IVB, VB, VIB and VIIB of the Periodic Table, namely, scandium, yttrium, lanthanum, titanium, zirconium, hafnium, vanadium, niobium, tantalum, chromium, molybdenum, wolfram and alloys thereof. The non-metallic component of the transient plastic phase may be selected from different elements, such as carbon, nitrogen, silicon, beryllium, oxygen, aluminum, magnesium and mixtures thereof.

Preferred transient plastic phase compounds are carbides, nitrides, oxides, aluminides, beryllides and silicides having a metallic component selected from Groups IIIB, IVB, VB, VIB and VIIB of the Periodic Table. Examples of suitable transient plastic phase compounds include carbides such as TiC, ZrC, HfC, VC, NbC, Ta$_2$C, TaC, SiC, MoC, WC and CrC; nitrides such as $Mg_2N_2$, TiN, ZrN, HfN, VN, NbN and TaN; aluminides such as TiAl; and silicides such as $TiS_3$, $Si_4Ti_5$, ZrSi, $ZrSi_2$ and $MoSi_2$. The ratio of metallic component to non-metallic component in the transient plastic phase prior to reaction is selected such that as the ratio of metallic component to non-metallic component decreases (i.e., as the transient plastic phase is depleted of metallic component), the transient plastic phase becomes harder and less ductile.

The transient plastic phase has a yield strength which is a function of the stoichiometric concentration of the metallic component in the transient plastic phase. The starting transient plastic phase is relatively soft and ductile. As the concentration of the metallic component is reduced, such as by transfer of a portion of the metallic component to the reactive phase, the softness and ductility of the transient plastic phase is reduced. By the present method, the transient plastic phase becomes a hard, non-ductile matrix phase.

The reactant phase comprises any compound or element which is capable of reacting with the metallic component of the transient plastic phase to reduce the concentration of the metallic component therein such that the softness and ductility of the transient plastic phase is reduced without a large decrease in the volume of the composite, i.e., less than about a 5% volume decrease. The reactant phase may comprise, for example, a non-metallic component such as carbon, nitrogen, boron, silicon, beryllium, oxygen, aluminum, magnesium and mixtures thereof. The reactant phase may also include a metallic component which is the same as or different from the metallic component of the transient plastic phase ceramic. Examples of suitable metallic components are set forth above.

Examples of suitable reactant phase materials include carbides such as TiC, ZrC, HfC, VC, NbC, $Ta_2C$, TaC, SiC, MoC, WC and CrC; nitrides such as $Mg_2N_2$, BN, AlN, $Si_3N_4$, TiN, ZrN, HfN, VN, NbN, and TaN; borides such as $TiB_2$, $TaB_2$, $ZrB_2$, $HfB_2$; aluminides such as TiAl; and silicides such as $TiS_3$, $Si_4T_5$, ZrSi, $ZrSi_2$ and $MoSi_2$. If the reactant phase is a compound having a metallic component and a non-metallic component, the ratio therebetween prior to reaction is selected to react with a portion of the metallic component of the transient plastic phase to yield a reinforcing phase in the matrix phase.

Suitable transient plastic phase and reactant phase materials are available commercially or may be synthesized, for example, by the method discussed below. Preferably, the transient plastic phase and reactant phase are each in powder form. Since densification occurs by plastic flow of the transient plastic phase, the particle size, size distribution and particle shape of the transient plastic phase and reactant phase are not believed to be critical method parameters, in contrast to conventional ceramic powder processing methods. However, the average particle diameter of the powder must be of the same order of magnitude as the diffusion distances involved in the reaction to ensure that the reaction goes to completion during the time scale of the experiment and that homogeneity is achieved in the final composite. The diffusion distance is a function of the temperature at which the reaction is carried out and the duration of time in which the reaction is permitted to proceed. However, generally, it is believed that the need for ultra-fine submicron powders and the inherent processing problems associated with the handling, agglomeration and cost thereof are reduced or eliminated by the present transient plastic phase process.

The composite may further include one or more reinforcing phases to provide increased strength and toughness in the composite. The reinforcing phases may be reactive or non-reactive with the transient plastic phase, as desired. An example of a reactive reinforcing phase is carbon fiber. In a composite in which the transient plastic phase in $TiC_{0.5}$, for example, the carbon fiber would react with excess Ti according to the equation $TiC_{0.5} + \frac{1}{2} C \rightarrow TiC_{1.0}$. A non-reactive reinforcing phase is one which is stable such that no reaction will occur between the reinforcing phase and the metallic component of the transient plastic phase. An example of a non-reactive reinforcing phase is SiC whiskers in alumina. The reinforcing phase may be in the form of whiskers, fibers, or any other shape, as desired.

The transient plastic phase and reactant phase for use in the TPPP method of the present invention may be prepared according to the following method. One of ordinary skill in the art would understand from the present disclosure that other methods may be used for making the transient plastic phase and reactant phase.

According to one aspect of the present method, a transient plastic phase and/or reactant phase may be synthesized, for example, by reacting a metallic component with a non-metallic component or compound. A portion of the metallic component and a first component of the non-metallic compound may be reacted to form the transient plastic phase. Another portion of the metallic component and a second component of the non-metallic compound may be reacted to form the reactant phase.

As presently preferred, the transient plastic phase and/or reactant phase is formed as a continuous part of the TPPP of the present invention. The transient plastic phase and/or reactant phase may be formed by mixing the metallic component and non-metallic component to form a mixture and compacting and/or heating the mixture to a temperature sufficient to synthesize the transient plastic phase and/or reactant phase in situ.

A non-limiting example of a reaction in which both a transient plastic phase and reactant phase are synthesized is set forth below in reaction equation (I):

$$4Ti + B_4C \rightarrow 2TiB_2 + 2TiC_{0.5} \quad (I)$$

In reaction equation (I), a metallic component (Ti) and ceramic compound ($B_4C$) are reacted in a 4:1 ratio to form a reactant phase ($TiB_2$) and a transient plastic phase ($TiC_{0.5}$).

According to the present method, the ceramic composite is densified by heating and applying pressure to the ceramic composite to plastically deform the transient plastic phase. During plastic deformation, substantially no change in the stoichiometric composition of either the transient plastic phase or reactant phase occurs.

This concept is illustrated in the second (middle) block of FIG. 1. In the plastic forming step, indicated by arrow 16, the green composite 10 consisting of the transient plastic phase 12 and reactant phase 14 is densified with essentially no change in the stoichiometric composition of the constituents.

The transient plastic phase may be plastically deformed by heating the composite to a densifying temperature which is less than the reaction temperature at which the stoichiometric composition of the transient plastic phase is altered. The temperature at which the deformation occurs depends upon the physical properties of the transient plastic phase, such as the rate at which the yield point decreases as the temperature increases and the volume fraction of the reactive phase in the composite and the temperature at which the reactant phase will react with the metallic component of the transient plastic phase. Generally, the deformation should be carried out at a temperature at least about 50° C., and generally about 50°-100° C., below the reaction temperature. For example, it is believed that the temperature of the reaction between $TiB_2$ and $TiC_{0.5}$ is about 1600° C.; therefore, the plastic deformation of the transient plastic phase ($TiC_{0.5}$) should be carried out at roughly 1400° C. to 1450° C.

The transient plastic phase is plastically deformed by the application of pressure and heat to the green composite. This can be accomplished by a variety of methods, such as hot pressing, hot isostatic pressing, hot forging and hot extrusion, for example. The pressure applied to the composite may vary, based upon such factors as the transient plastic phase material and the amount of heat being applied to the composite. As a non-limiting example, the composite may be hot pressed at a pressure of about 40 MPa.

The densified ceramic composite is strengthened and hardened by reacting the transient plastic phase and reactant phase, each in the solid state, at a reaction temperature lower than the melting temperature of either the transient plastic phase or the reaction phase. As presently preferred, the reaction temperature is about 1200° to about 1800° C. As a non-limiting example, the reaction temperature of a ceramic composite of $TiB_2$ and $TiC_{0.5}$ is roughly 1600° C.

By heating the ceramic composite to the reaction temperature, a portion of the metallic component of the transient plastic phase is transferred to the reactant phase. This transfer of metallic component not only increases the yield strength of the transient plastic phase to form a more refractory matrix phase, but also forms a reinforcing phase in situ from the reactant phase and the transferred portion of the metallic component to further strengthen, harden and toughen the ceramic composite. In other words, the transient plastic phase is depleted of the metallic component, which shifts the transient phase from a more ductile to a more refractory condition.

This reaction step is indicated generally by arrow 18 in FIG. 1. During reaction synthesis, the stoichiometric concentration of the metallic component in the transient plastic phase 12 is reduced, thereby forming the more refractory matrix phase 20. The portion of the metallic component of the transient plastic phase 12 which is transferred to the reactant phase 14 causes the reactant phase 14 to form a reinforcing phase 22 to thereby strengthen, harden and toughen the ceramic composite. The third (right-hand) block of FIG. 1 shows the matrix phase 20 and reinforcing phase 22.

Two non-limiting examples of reactions in which a portion of a metallic component of a transient plastic phase is transferred to a reactant phase are set forth in reaction equations (II) and (III):

$$2TiC_{0.5} + 2B \rightarrow TiC + TiB_2 \qquad (II)$$

$$2TiC_{0.5} + SiC \rightarrow 2TiC + Si \qquad (III)$$

In both of reaction equations (II) and (III), $TiC_{0.5}$ is the transient plastic phase and TiC is the more refractory matrix phase. In reaction equation (II), B is the reactant phase and $TiB_2$ is the reinforcing phase. In reaction equation (III), SiC is the reactant phase and Si is the reinforcing phase.

Generally, the reaction time for reacting the transient plastic phase and the reactant phase must be longer than the time required for densification of the transient plastic phase by plastic forming to allow sufficient time to permit the densification to proceed to completion. This condition may be met if the transient plastic phase is relatively ductile at higher temperatures and/or the reaction rates are slow. The time for densification depends upon such factors as the applied stress and the creep properties of the transient plastic phase.

To achieve essentially full (theoretical) density of the ceramic composite, the volume change of the composite should occur almost entirely during the densification step so that the volume change during reaction synthesis will be small, i.e., less than about 5 vol %. This volume change is due to the difference in the specific volumes of the transient plastic phase and reactant phase in the densified composite versus the resulting refractory matrix phase and reinforcing phase in the final ceramic composite. Since the foregoing TPPP reaction is generally exothermic, the overall volume change of the constituents will normally be negative, giving rise to internal porosity in the product. If the amount of shrinkage in the reaction step is small, i.e., less than about 5 vol %, porosity can be easily eliminated by applying moderate pressure during the reaction or by high temperature annealing of the ceramic composite.

Generally, the free energy of the reaction must also be negative. The free energy of the reaction can be determined by examining the compatibility triangles in the particular system's ternary phase diagram or by carrying out simple reaction thermodynamic calculations.

After the ceramic composite has been strengthened and densified according to the present method, the composite may be further shaped, for example, by electron discharge machining, or included in graded composites, as desired.

To illustrate the basic principles involved in the TPPP method of the present invention, the following General Example has been provided. This example is for purposes of illustration only and is not intended to be limiting, particularly with respect to the choice of the transient plastic phase and the reactant phase.

GENERAL EXAMPLE

Figure 2:
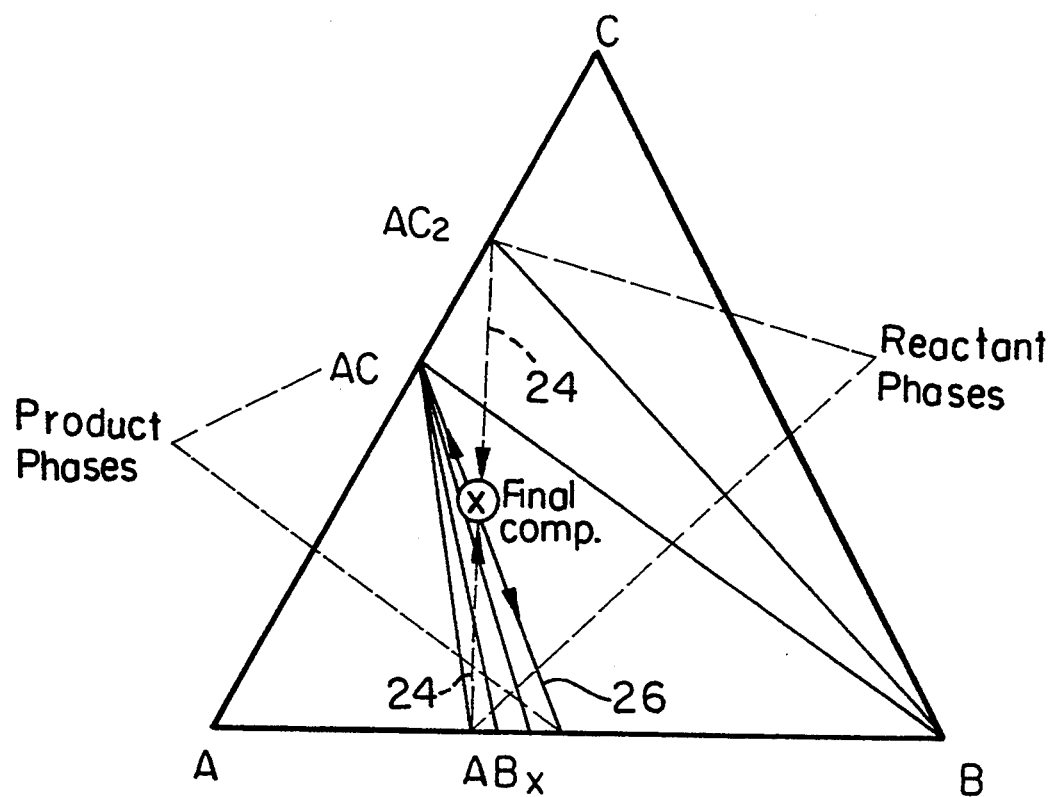
FIG. 2 is an isothermal section of a ternary phase diagram for general components ABC illustrating possible compositional changes according to the present invention.

In this general example, the transient plastic phase is represented by $AB_x$ and the reactant phase is represented by $AC_2$, where A is the metallic component and B and C are each non-metallic components. An isothermal section of the corresponding ABC ternary phase diagram at the reaction temperature is shown in FIG. 2. In this example, the A-rich compositions of $AB_x$ are assumed to have lower yield strength than the B-rich compositions along the binary AB composition axis of the ternary diagram.

According to the present TPPP method, the transient plastic phase $AB_x$ and reactant phase $AC_2$ are mixed, preferably in powder form, and hot pressed, extruded or forged. Following the initial densification step, in which the transient plastic phase is plastically deformed, the transient plastic phase (TPP) and reactant phase (RP) are reacted according to the general reaction equation (IV) to form a refractory matrix phase (RMP) from the transient plastic phase and a reinforcing phase (RIP) from the reactant phase and a portion of the metallic component of the TPP:

$$TPP + RP \rightarrow RMP + RIP \qquad (IV)$$

With reference to FIG. 2, the reaction according to the present invention is represented by the formula (V):

$$AB_x + (1-x)AC_2 \rightarrow xAB + 2(1-x)AC \qquad (V)$$

where "AB" is the more refractory matrix phase and "AC" is the reinforcing phase in the resulting ceramic composite.

The ductility of the $AB_x$ component (i.e., A-rich) promotes full densification of the composite and the formation of net or near-net shape articles from the composite. As shown in FIG. 2, as the reaction in equation (V) proceeds, $AB_x$ towards the B-rich end of the binary line AB and the line 24 pivots and rotates around point X towards line 26 which shifts the composition of the transient plastic phase transient plastic phase thus becomes more refractory. This reaction depletes the transient plastic of the element A that renders it ductile. Concurrently, the reactant phase $AC_2$ is transformed into the reinforcing phase AC.

Figure 3:
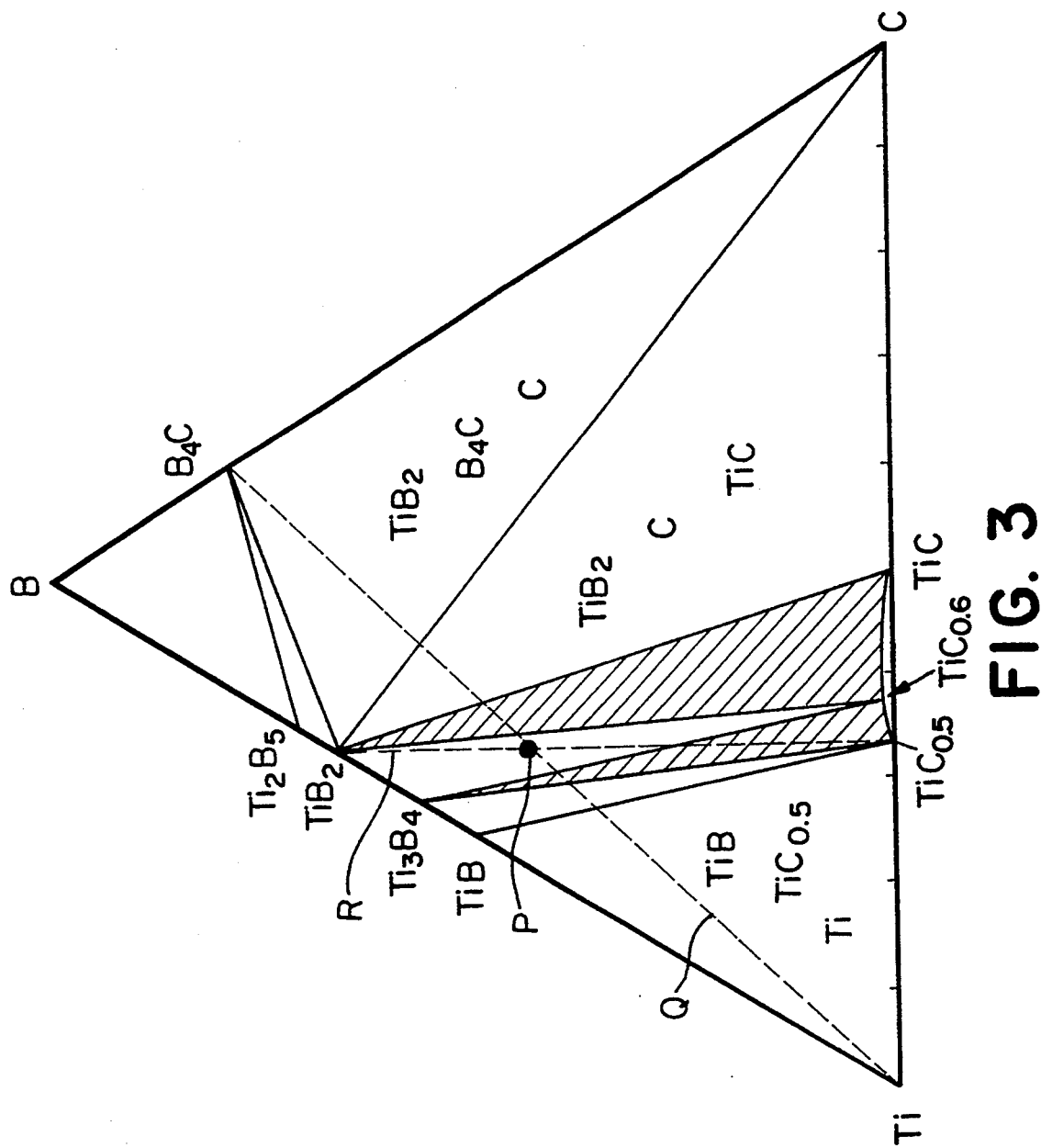
FIG. 3 is an isothermal section of a ternary Ti—B—C phase diagram illustrating possible compositional changes according to the present invention.

More specific, non-limiting examples of the present transient plastic phase processing method are set forth in the following specific example focusing on the Ti—B—C system, where B is boron and C is carbon. The pertinent isothermal section of the ternary Ti—B—C phase diagram is shown in FIG. 3. In the Ti—B—C system, the transient plastic phase is $TiC_x$, which has a yield strength which is a strong function of the mole fraction x. For example as x decreases from 0.93 to 0.66, the compressive yield stress at 1200° C. decreases from about 430 MPa to below 65 Pa, as disclosed by D. Miracle et al., "Mechanical Properties of Fine-Grained Substoichiometric TiC" 66(8) J. Am. Cer. Soc'y 592-96 (1983) As shown in FIG. 3, four phases exist along the Ti—B binary composition line, namely $Ti_2B_5$, $TiB_2$, $Ti_3B_4$ and TiB.

SPECIFIC EXAMPLES

High purity titanium metal (−325 mesh, 4N purity, which is commercially available from Alta Group of Fombell, Pennsylvania) and boron carbide powder (−325 mesh, which is commercially available from ESK of Germany) were mixed in 3:1 and 4:1 molar ratios, respectively. The titanium powder was an angular hydride-dehydride powder having a 12 μm average agglomerate size. The average particle size of the titanium was determined to be about 10 nm from x-ray diffraction line broadening. The particle size of the boron carbide powder ranged from about 0.5 to about 9 μm, the average particle size being about 5 μm. X-ray diffraction indicated that graphite was an impurity in the boron carbide. Using x-ray calibration curves, the volume fraction of the graphite in the boron carbide was estimated to be about 10 mole percent. The graphite impurity is believed not to have any significant effect upon the reaction. Therefore, in the reaction discussed below, for purposes of convenience only, it will be assumed that the starting composition was pure boron carbide.

The titanium and boron carbide powders were mixed and wet ball-milled for 24 hours in a solvent, namely 2-propanol, and dried under vacuum at room temperature. The dried mixture was then V-blended in a sealed container for 12 hours. The powder mixture was cold compacted at 400 MPa into 6.9×1.2×0.5 cm bars. The green density of each bar was determined, the results of which are set forth in Table I. The theoretical densities of TiC, $TiB_2$ and $Ti_3B_4$ were taken to be 4.9, 4.5 and 4.6 g/cc, respectively. The green density of each of the bars of the 3:1 composition ranged from 65 to 68% of theoretical density and 73 to 75% for the 4:1 composition. The higher metal content of the 4:1 composition bars clearly enhanced the green density of the ceramic composite.

For each test run, two green bars of the same composition were placed side-by-side in a 2.54×7.62 cm graphite die and hot pressed under vacuum for varying times and temperatures. The processing conditions and data for each run are set forth in Table I.

After hot pressing, the reaction products were evaluated by CuK radiation x-ray analysis using Siemens D-500 System X-ray equipment, which is commercially available from Siemens of Germany. The phases present on the surface of each sample and the phase distribution were found to differ from the exterior to the interior of each sample. Therefore, in addition to scanning the surface, each specimen was powdered for further analysis. The phases reported in Table I were determined from the powdered samples. The final density of each sample was measured using Archimedes' principle in water.

Each sample was microstructurally analyzed by SEM on polished and etched cross-sections, as well as fractured surfaces. Some samples were etched in a mixture of 5:5:2 water:nitric acid:hydrofluoric acid for 1 minute.

To quantify the reaction kinetics, a series of differential thermal analyses run on the 3:1 stoichiometric powder mixtures were conducted using a DTA 1700 differential thermal analysis equipment, which is commercially available from Perkin Elmer Co. of Norwalk, Connecticut. Each sample was heated to a selected temperature under an argon blanket at a rate of 10° C./min and held at the selected temperature for 10 minutes. The heating rate was chosen to correspond to that which was used during hot pressing. Following each DTA run, each sample was analyzed for phase composition by x-ray diffraction.

Each hot pressed sample was subjected to a number of preliminary physical and mechanical tests, including 4-point bend tests (outer span 4 cm, inner span 2 cm with a cross-head speed of 0.01 mm/s) using a MTS ceramic testing system, which

TABLE I

| | Transient Plastic Phase Processing: Ti—B—C System | | | | | | | | |
| | | | | | | Processing Conditions | | | |
| | | | | | | Stage 1 | | Stage 2 | | |
| Run No. | Initial Stoichiometry | Green Density (g/cc) | Final Density (g/cc) | Percentage Theoretical Density | Phases Present | Temp (°C.) | Time Hrs. | Temp (°C.) | Time Hrs. | Pressure (MPa) |
|---|---|---|---|---|---|---|---|---|---|---|
| 1 | 3:1 | 2.56 | 2.5 | 54 | TiC, $TiB_2$ | | | 1600 | 5 | 0 |
| 2 | 3:1 | 2.54 | 3.8 | 83 | TiC, $TiB_2$ | | | 1600 | 5 | 34 |

TABLE I-continued

Transient Plastic Phase Processing: Ti—B—C System

| | | | | | | Processing Conditions | | | | |
|---|---|---|---|---|---|---|---|---|---|---|
| | | | | | | Stage 1 | | Stage 2 | | |
| Run No. | Initial Stoichiometry | Green Density (g/cc) | Final Density (g/cc) | Percentage Theoretical Density | Phases Present | Temp (°C.) | Time Hrs. | Temp (°C.) | Time Hrs. | Pressure (MPa) |
| 3 | 3:1 | 2.52 | 3.4 | 86 | TiC, TiB$_2$ | | | 1600 | 5 | 41 |
| 4 | 3:1 | 2.56 | 3.69 | 86 | TiC, TiB$_2$ | 750 | 2 | 1600 | 2 | 41 |
| 5 | 3:1 | 2.55 | 4.04 | 88 | TiC, TiB$_2$ | 750 | 4 | 1600 | 4 | 41 |
| 6 | 3:1 | 2.56 | 4.15 | 90 | TiC, TiB$_2$ | 800 | 2 | 1600 | 4 | 41 |
| 7 | 3:1 | 2.54 | 4.24 | 92 | TiC, TiB$_2$ | 800 | 4 | 1600 | 4 | 41 |
| 8 | 4:1 | 2.85 | 3.21 | 68 | TiC$_{0.6}$, TiB$_2$, Ti$_3$B$_4$ | HD 1600* | | 1600 | 5 | 0 |
| 9 | 4:1 | 2.84 | 4.57 | 97 | TiC$_{0.6}$, TiB$_2$, Ti$_3$B$_4$ | HD 1600 | | 1600 | 4 | 41 |
| 10 | 4:1 | 2.86 | 4.55 | 96 | TiC$_{0.6}$, TiB$_2$ Ti$_3$B$_4$ | HD 1600 | | 1600 | 5 | 34 |
| 11 | 4:1 | 2.83 | 4.64 | 98 | TiC$_{0.54}$, TiB$_2$, Ti$_3$B$_4$ | HD 1600 | | 1600 | 5 | 41 |
| 12 | 4:1 | 2.85 | 4.34 | 92 | TiC$_{0.6}$, TiB$_2$ Ti$_3$B$_4$ | 800 | 4 | 1600 | 0.33 | 41 |
| 13 | 4:1 | 2.86 | 4.69 | 99 | TiC$_{0.6}$, TiB$_2$ Ti$_3$B$_4$ | 800 | 4 | 1600 | 4 | 41 |

*Heated directly to 1600° C.

is commercially available from MTS of Minneapolis, Minnesota. A portion of each sample, 3×3×45 mm in size, was electron discharge machined from the hot pressed plates. The surface of each sample was finished by wet grinding on a 150 grit diamond wheel in a direction parallel to the length of each bar. The tensile face was further ground to a 30 μm finish using diamond paste. The edges were bevelled to eliminate edge effects. The hardness of each sample was measured by a Vickers diamond indenter using a load of 300 grams. The fracture toughness of each sample was also estimated from the indentations, according to the procedure set forth in A. Evans et al., "Fracture Toughness Determinations by Indentation", 59(7–8) *J. Am. Cer. Soc'y* 371-72 (1976). A summary of the average physical properties is set forth in Table II.

TABLE II

Summary of Properties Measured For Composite

| Composition | Bend Strength | Fracture Toughness # (MPa√m) | Hardness (GPa) | Thermal Expansion (200–1350° C.) |
|---|---|---|---|---|
| 3:1 | 100 ± 20 MPa | 4–5 | 18–24 | — |
| 4:1 | 590 ± 30 MPa | 5.6 ± 0.6 | 18–30 | 6.5 × 10$^{6°}$ C.$^{-1}$ |

Based upon the x-ray diffraction results of the 3:1 powders that were heated in the DTA, the reaction sequence of the 3:1 composition occurred according to reaction equations (VI and VII):

$$3Ti + B_4C \rightarrow 2/3 TiB + 2/3 Ti_2B_5 + TiC \quad \text{(VI)}$$

followed by:

$$2/3 TiB + 2/3 Ti_2B_5 \rightarrow 2TiB_2 \quad \text{(VII)}$$

The net overall reaction is given by reaction equation (VIII) as follows:

$$3Ti + B_4C \rightarrow 2TiB_2 + TiC \quad \Delta V = -22\% \quad \text{(VIII)}$$

At about 1400° C., the TiB and Ti$_2$B$_5$ phases disappear. Thus, upon reaching the maximum temperature during hot pressing (1600° C.), the only phases present are TiC and TiB$_2$. The mole fraction x of TiC$_x$, after reaching the reaction temperature, is greater than 0.95. The overall volume change (ΔV) upon reaction is negative.

The reaction sequence for the 4:1 composition was quite different. From the x-ray diffraction results of the DTA samples and the final processed samples, the following observations were made (1) the DTA runs of short duration (10 mins) resulted only in trace amounts of Ti$_3$B$_4$. The phases present at that point were TiB$_2$ and TiC$_{0.5}$ in roughly the same proportions; (2) the mole fraction x in TiC$_x$ changed from 0.55 to 0.57 (the lattice parameter changed from 3.075 to 3.104 A) as the time the composite was held at 1600° C. was increased from 20 minutes to 4 hours (see runs 12 and 13). The mole fraction x was determined from the lattice parameter d using data set forth in E. Rudy, "Ternary Phase Equilibria in Transition Metal-Boron-Carbon-Silicon Systems, Part V", *Air Force Materials Laboratory* AFML-TR-65-2 (1965); (3) after 4 hours at 1600° C., the volume fractions of TiC$_{0.6}$, Ti$_3$B$_4$ and TiB$_2$ were determined to be approximately 0.43, 0.25 and 0.32, respectively (4) the volume fractions of the phases determined from the areas under the x-ray peaks after hot pressing at 1600° C. for 4 hours (assuming that the electron densities of the three phases were identical) were found to be 0.17 Ti$_3$B$_4$, 0.50 TiC$_{0.6}$ and 0.32 TiB$_2$; and (5) as the intensity of the Ti$_3$B$_4$ peaks increased, a decrease in the TiB$_2$ peaks was observed. The fraction of Ti$_3$B$_4$ increased from 0.12 to 0.17 as the time the composite was held at 1600° C. increased from 20 minutes to 4 hours.

Based upon these observations, the densification and reaction sequence for the 4:1 composition is set forth in reaction equations (IX) and (X), respectively, as follows:

$$4Ti + B_4C \rightarrow 2TiB_2 + 2TiC_{0.5} \Delta V = -13\% \quad \text{(IX)}$$

$$2TiB_2 + 2TiC_{0.5} \rightarrow 0.33 Ti_3B_4 + 1.66 TiC_{0.57} + 1.3\text{-}3TiB_2 \Delta V = -3\% \quad \text{(X)}$$

The net reaction at equilibrium is given by reaction equation (XI):

$$4Ti + B_4C \rightarrow 0.33 Ti_3B_4 + 1.66 TiC_{0.6} + 1.3\text{-}3TiB_2 \Delta V = -16\% \quad \text{(XI)}$$

The mole fraction x of TiC$_x$, as well as the equilibrium number of phases and the relative amounts, are linked and depend upon where the initial composition (i.e., 4 Ti:B$_4$C) lies within the Ti—B—C ternary phase diagram shown in FIG. 3. The 4:1 starting composition lies almost halfway along the line Q joining Ti to B$_4$C, shown as point P in FIG. 3. Upon reaction, the line Q joining Ti to B$_4$C pivots around point P to yield TiB$_2$ and TiC$_{0.5}$ in roughly equal amounts, as shown by line R. This conclusion is supported by the x-ray diffraction results. Further reaction forms Ti$_3$B$_4$ and C-rich TiC$_x$. The Ti$_3$B$_4$ forms at the expense of TiB$_2$, with the excess titanium being supplied by the TiC$_{0.5}$.

The value of x is fixed by the three phases coexisting at equilibrium. The best estimate of that value based on the results obtained above is 0.6. With the mole fraction x=0.6, and according to reaction equation (XI), the equilibrium volume fractions of the Ti$_3$B$_4$, TiC$_{0.6}$ and TiB$_2$ are calculated to be 0.25, 0.37, and 0.37, respectively (the molar volumes of Ti$_3$B$_4$, TiB$_2$ and TiC$_{0.6}$ were taken to be 40.64, 15.38 and 12.3, respectively). These values closely correspond to the volume fractions of the three phases observed microstructurally, namely 0.25, 0.43 and 0.32, respectively, especially since the boron carbide was partially contaminated with graphite.

The results are also consistent, within experimental error, with the volume fractions of the phases determined from the areas under various x-ray diffraction peaks, namely 0.17 for Ti$_3$B$_4$, 0.50 for TiC$_{0.6}$ and 0.32 for TiB$_2$. The lower volume fractions for Ti$_3$B$_4$ are believed to be due to the preferred orientation of this compound as a result of its plate-like morphology. It is believed that the slight discrepancy between the value of x determined from the lattice parameter, namely 0.57, and the value of 0.6 is due to some boron atoms diffusing into the TiC$_x$ to form a solid solution with the latter.

According to reaction equation (X), the Ti$_3$B$_4$ phase should grow at the expense of TiB$_2$, with the extra titanium atom coming from the TiC$_{0.5}$ phase. Therefore, microstructurally, the area surrounding the Ti$_3$B$_4$ should be depleted of the TiB$_2$ phase. SEM analysis of 4:1 composites hot pressed for 20 minutes and 4 hours and corresponding x-ray diffraction patterns show three distinct phases, namely a long plate-like gray phase, a light phase and a darker phase. The plate-like phase is Ti$_3$B$_4$. The light areas are TiC$_x$ and the dark areas are believed to be pure TiB$_2$, however the dark areas may be two phase mixtures of TiB$_2$ and TiC$_{0.5}$.

Reaction (IX) is essentially complete after heating the powders to 1500° C. at 10° C./min and holding for 10 minutes. The reaction shown in equation (X), however, is quite slow. The slowness of this reaction and the negligible volume change accompanying it, together with the ductility of the TiC$_{0.5}$ phase is believed to be important in obtaining the theoretical densities for this composite. As noted above, the volume change for reaction equation (IX) is about −13%, whereas the volume change for reaction equation (X) is about −3%.

The concept of TPPP according to the present method is clearly demonstrated when runs 7, 12 and 13 are compared. In each of these runs, upon reaching 1600° C., the predominant phases present were TiB$_2$ and TiC$_x$. The value of the mole fraction x was greater than 0.9 for run 7 (3:1 composition). In run 7, 4 hours at 1600° C. was insufficient to eliminate the volume shrinkage that occurred during the reaction given by reaction equation (VIII). The highest density obtained for the 3:1 compositions was 92%. In contrast, the mole fraction x for runs 12 and 13 (4:1 composition) was about 0.54 and 0.6, respectively. In run 12, 92% density was achieved after heating for only 0.33 hours at 1600° C. compared to 4 hours at 1600° C. for run 7. For the 4:1 composition of run 13, heating at 800° C. for 4 hours, then 1600° C. for 4 hours resulted in a dense final compact in which the final density of the sample was greater than 99% of theoretical. The "pinning" of the TiC$_x$ composition at the relatively soft mole fraction value of x=0.6 permitted the flow of the TiC$_{0.6}$ which helped reduce the −3% volume change. However, the refractory matrix did not reach its hardest state which corresponds to TiC$_{1.0}$.

Another observation that supports the aforementioned hypothesis is the fact that surfaces of most of the samples were porous. It is believed that carbon diffusion from the graphite dies into the surface layers of the samples increases the carbon content of the TiC$_x$ sufficiently to render it non-plastic, which interfered with the densification of the surface of the samples.

The desirability of applying pressure during the plastic deformation step is shown by comparing run 1 with any of runs 2–7 and run 8 with any of runs 9–13, in which pressure was applied to the composite. When no pressure was applied (runs 1 and 8), the final density after sintering was even less than the initial green density, reflecting the effect of the negative volume changes upon reaction on the final density.

Based upon the foregoing experiments, the attainment of near full density for the 4:1 composition is believed to be due to the presence of an intermediate metastable transient plastic phase (TiC$_{0.5}$) which was not formed during the processing of the 3:1 compositions. The creep and plastic deformation of the transient plastic phase accommodates the large volume changes, which would otherwise occur in the reaction, resulting in dense ceramic composites. The absence of such a phase as in the case of the 3:1 composition, resulted in a porous final composite. Upon reaction, the composition of the transient plastic phase shifts towards a more refractory composition.

The present TPPP method provides the ability to fabricate complex shapes of ultra-refractory, fully dense ceramic composites at relatively low temperatures, generally less than 65% of the absolute melting temperature of the constituents. Near net-shape parts and components may be cost effectively mass produced since, after the plastic deformation step, if the porosity is not interconnected (i.e., if the density is greater than about 93% of theoretical) it is possible to hot isostatically press the part to full density without encapsulating the part, thereby reducing the cost and simplifying the process. After consolidation by plastic forming, but prior to reaction, preforms can be machined to high tolerances while in a ductile or soft condition. After achieving precise dimensions, the reaction synthesis can be initiated to form essentially fully dense composites with negligible shrinkage. The composites fabricated according to the present method have been sufficiently conductive to be routinely machined by electron discharge machining. By reducing or eliminating the need for sintering aids, the high temperature properties of the composites, most notably the creep resistance, should be greatly enhanced. Other reinforcing agents may be incorporated into the composite to control strength and/or toughness. These reinforcements can be either reactive or non-reactive. By the present method, it is also believed that the present composites may be used to form graded composites having a metal component joined to a ceramic/ceramic composite.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for densifying, strengthening and toughening a ceramic composite into a structure comprising (1) a transient plastic phase comprising a metallic component and (2) a reactant phase, the transient plastic phase having a yield strength which is a function of the stoichiometric concentration of the metallic component in the transient plastic phase, comprising the steps of:
  (a) heating and applying pressure to the composite to plastically deform the transient plastic phase and thereby yield a densified ceramic composite structure; and
  (b) heating the densified ceramic composite structure to react the transient plastic phase and the reactant phase in the solid state at a reaction temperature lower than the melting temperature of either of the transient plastic phase or the reactant phase such that a portion of the metallic component of the transient plastic phase is transferred to the reactant phase to form a reinforcing phase whereby a strengthened and toughened ceramic composite structure is formed comprising: (1) a matrix phase which has a higher yield strength and is more refractory than the transient plastic phase; and (2) a reinforcing phase in the matrix phase which is formed in situ from the reactant phase and the portion of the metallic component transferred from the transient plastic phase.

2. The method according to claim 1, wherein the metallic component is a transition metal.

3. The method according to claim 1, wherein the metallic component is selected from the group consisting of scandium, yttrium, lanthanum, titanium, zirconium, hafnium, vanadium, niobium, tantalum, chromium, molybdenum, wolfram, and alloys thereof.

4. The method according to claim 1, wherein the transient plastic phase further comprises a second component selected from the group of elements consisting of carbon, nitrogen, silicon, beryllium, oxygen, aluminum and magnesium.

5. The method according to claim 1, wherein the transient plastic phase is a carbide, nitride, oxide, aluminide, beryllide or silicide compound in which the metallic component is selected from the group consisting of elements of Groups IIIB, IVB, VB, VIB and VIIB of the Periodic Table.

6. The method according to claim 1, wherein the reactant phase comprises a metallic component that is the same as or different from the metallic component of the transient plastic phase.

7. The method according to claim 6, wherein the reactant phase comprises a second component selected from the group of elements consisting of carbon, nitrogen, boron, silicon, beryllium, oxygen, aluminum and magnesium.

8. The method according to claim 1, wherein the reactant phase is an element or compound which reacts with the metallic component of the transient plastic phase to reduce the concentration of the metallic component in the transient plastic phase to reduce softness and ductility of the transient plastic phase.

9. The method according to claim 1, wherein in step (a) the composite is heated to a densifying temperature at least about 50° C. lower than the reaction temperature of step (b).

10. The method according to claim 1, wherein the pressure applied to the composite in step (a) is about 40 MPa.

11. The method according to claim 1, wherein the step (a) further comprises forming the transient plastic phase from the metallic component and a non-metallic component prior to plastic deformation of the transient plastic phase.

12. The method according to claim 1, wherein the reaction temperature of step (b) is about 1200° C. to about 1800° C.

13. The method according to claim 1, wherein the volume change of the composite during reaction step (b) is less than about 5 vol. %.

14. The method according to claim 1, wherein step (b) further comprises applying pressure to the densified ceramic composite structure.

15. The method according to claim 1, wherein the composite comprises a further reinforcing phase which is present with the transient plastic phase and the reactive phase before densifying of the composite.

16. The method according to claim 15, wherein the further reinforcing phase reacts with the metallic element of the transient plastic phase.

17. The method according to claim 1, wherein the step (a) further comprises reacting a metallic component with a non-metallic compound to form (1) the transient plastic phase from a portion of the metallic component and a first component of the non-metallic compound and (2) the reactant phase from another portion of the metallic component and a second component of the non-metallic compound.

18. The method according to claim 17, wherein the non-metallic compound is $B_4C$.

19. The method according to claim 17, wherein the metallic component is titanium.

20. The method according to claim 1, wherein the transient plastic phase is $TiC_{0.5}$.

21. The method according to claim 1, wherein the reactant phase is $TiB_2$.

22. The method according to claim 1, wherein the matrix phase is $TiC_{0.6}$ and the reinforcing phase is $Ti_3B_4$.

23. A method for densifying, strengthening and toughening a ceramic composite into a structure comprising (1) a transient plastic phase comprising a metallic component and (2) a reactant phase, the transient plastic phase having a yield strength which is a function of the stoichiometric concentration of the metallic component in the transient plastic phase, comprising the steps of:
  (a) heating and applying pressure to the composite to form a transient plastic phase from a metallic component and a second component and to plastically deform the transient plastic phase and thereby produce a densified ceramic composite structure; and
  (b) heating the densified ceramic composite structure to react the transient plastic phase and the reactant phase in the solid state at a reaction temperature lower than the melting temperature of either of the transient plastic phase or the reactant phase such that a portion of the metallic component of the transient plastic phase is transferred to the reactant phase to produce a reinforcing phase whereby a strengthened and toughened ceramic composite structure is formed comprising: (1) a matrix phase which has a higher yield strength and is more refractory than the transient plastic phase; and (2) a reinforcing phase in the matrix phase which is formed in situ from the reactant phase and the portion of the metallic component transferred from the transient plastic phase.

24. The method according to claim 23, wherein step (a) further comprises reacting a portion of the metallic component with a second component to form the reactant phase.

25. The method of claim 24 wherein said reactant phase and said transient plastic phase are formed in-situ.

* * * * *